June 2, 1970  O. M. ANDERSON  3,514,902
TOP DOOR MECHANISM FOR TOP LOADING REFUSE VEHICLE
Filed Feb. 14, 1969  2 Sheets-Sheet 1
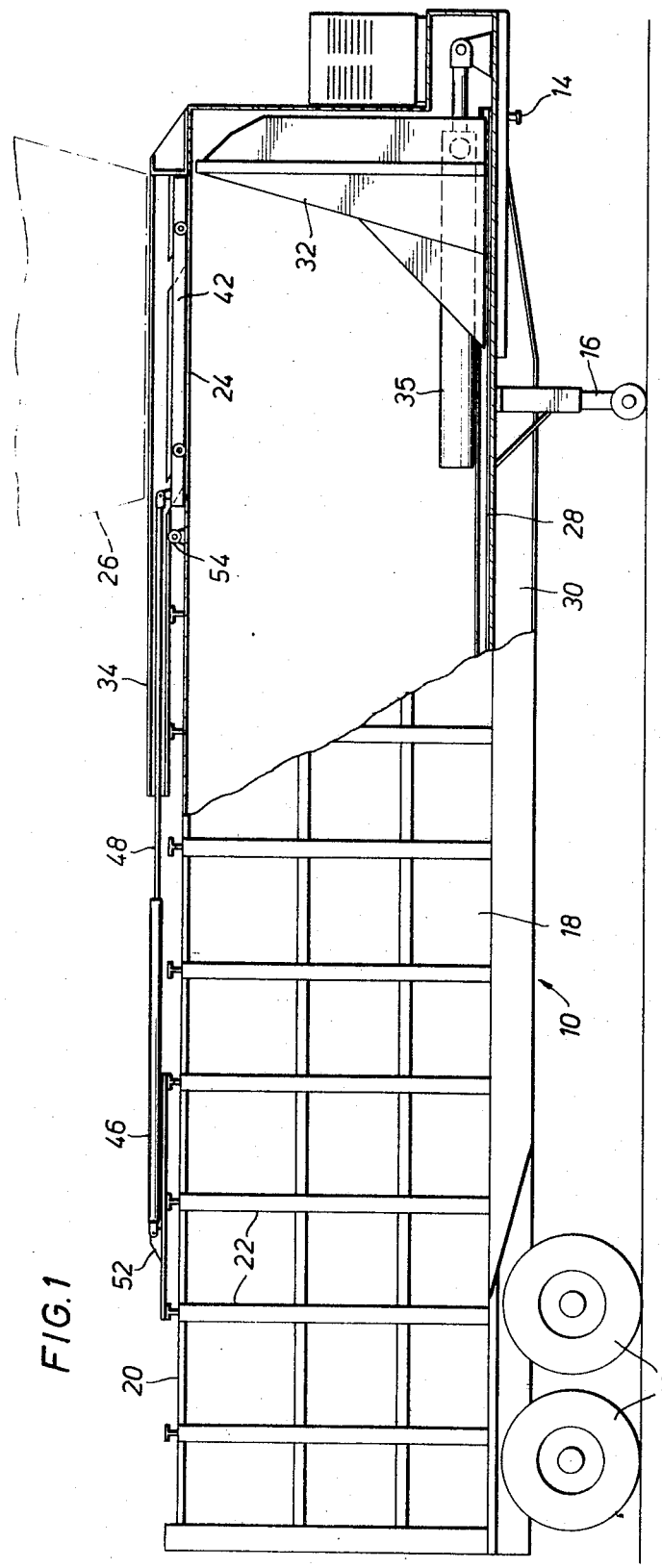
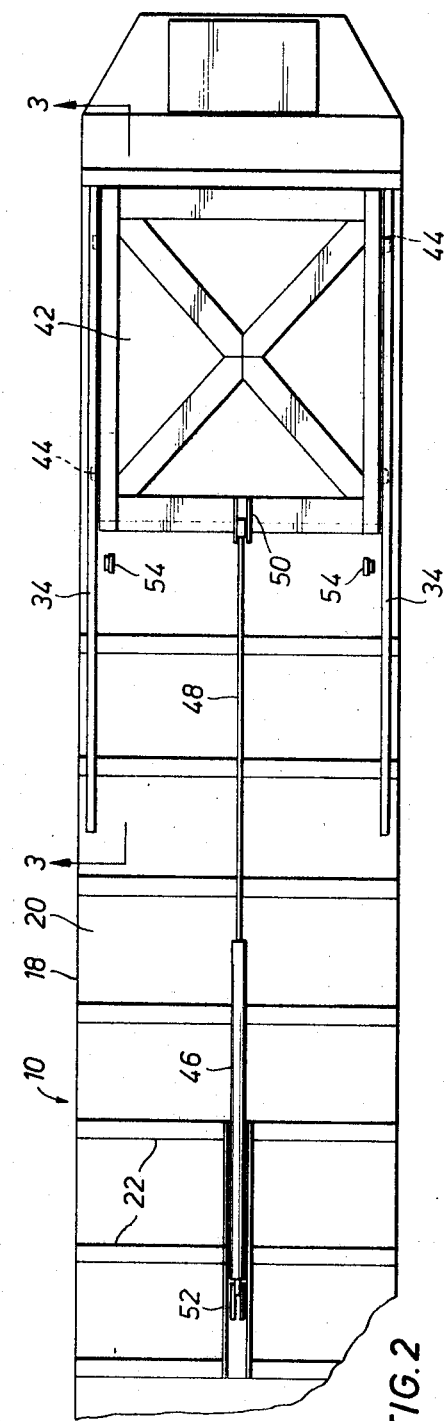
Orin M. Anderson
INVENTOR
BY Charles E. Lightfoot
ATTORNEY

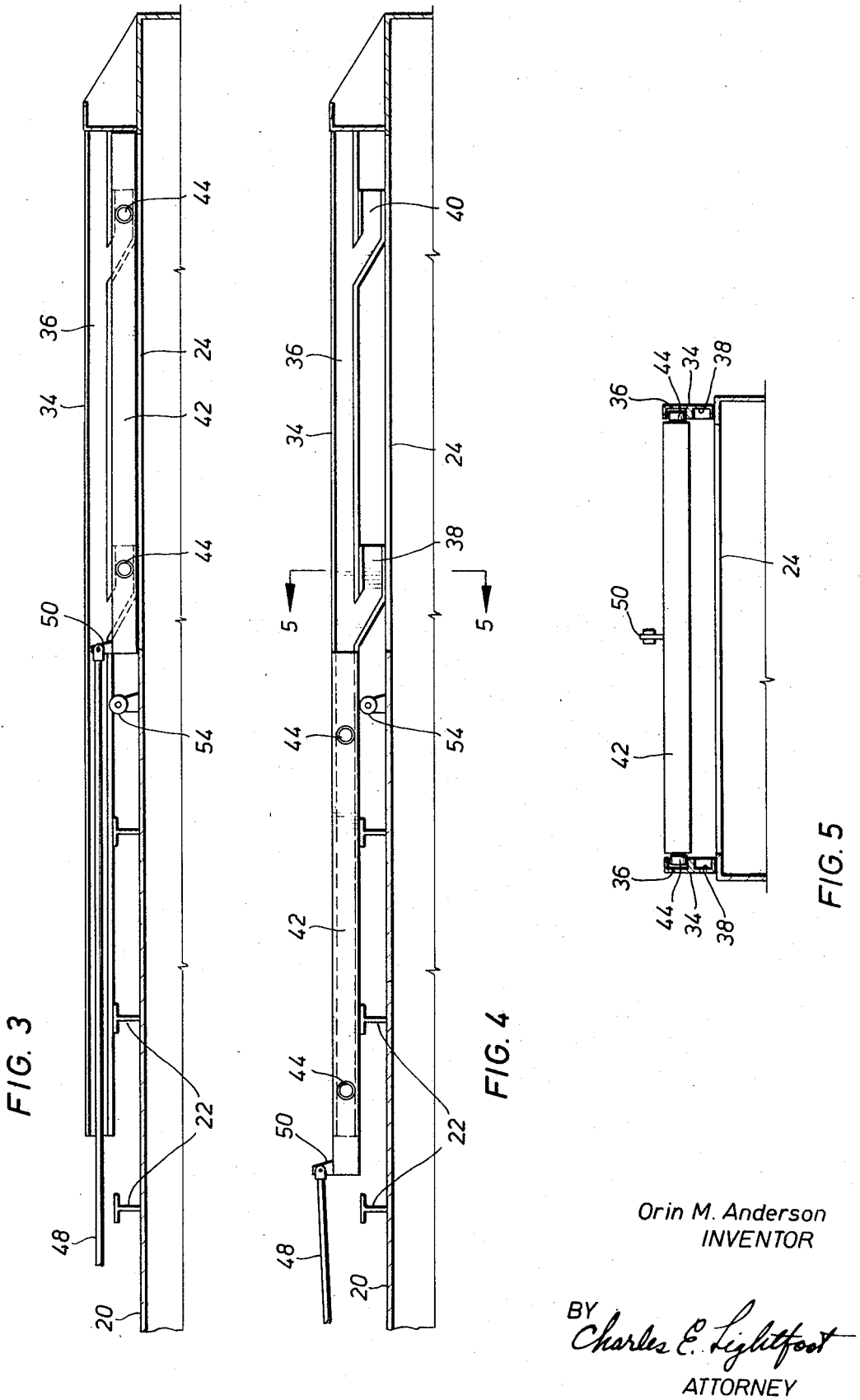

United States Patent Office 3,514,902
Patented June 2, 1970

---

3,514,902
TOP DOOR MECHANISM FOR TOP LOADING REFUSE VEHICLE
Orin M. Anderson, P.O. Box 14147,
San Antonio, Tex. 78214
Filed Feb. 14, 1969, Ser. No. 799,207
Int. Cl. E05d 15/10
U.S. Cl. 49—213                   1 Claim

ABSTRACT OF THE DISCLOSURE

Top door mechanism for refuse vehicles of the top loading type having a door which is movable longitudinally of the vehicle into and out of closing relation to a top opening in the vehicle body. The mechanism includes a trackway having rails extending along the sides of the door opening and beyond one end thereof and each of which is formed with a main rail portion spaced above the top of the body and longitudinally spaced turnout portions positioned within the front and rear edges of the door opening and extending downwardly from and in parallel relation to said main portion, and along which trackway the door is movable on rollers. The door is movable along the trackway from an open position in which the door is supported on said main rail portions spaced above the top wall of the body to a closed position supported on said turnouts with the inner face of the door in engagement with said top wall and closing said opening. Means is provided for holding the door against the movement of the door rollers into the turnouts until the door is nearly closed whereby joining of the door during its closing movement is prevented.

The door is supported in closed position with its inner face substantially in the plane of the top wall of the body to form a substantially continuous inside surface throughout the length of the top of the body when the door is closed.

BACKGROUND OF THE INVENTION

In the collection and disposal of refuse. it is customary to make use of vehicles having relatively large bodies such as vehicles of the trailer type having top loading openings closed by longitudinally movable sliding or rolling doors.

Vehicles of this type usually have a rear door against which refuse may be compacted when the vehicle is being loaded and through which the vehicle may be emptied. Refuse compacting means is usually provided in such vehicles, in the form of an upright, longitudinally movable compaction plate or blade which is more or less closely fitted to the internal shape of the body and by which refuse loaded into the body rearwardly of the plate is moved toward the rear of the body and compacted against the rear door. The compaction plate is also used to eject the refuse from the vehicle when the rear door is opened to empty the vehicle.

The top loading openings of refuse vehicles of this kind are usually located at the front end of the body, and the side and top walls of the body are strengthened and reinforced by external ribs or flanges which extend outwardly for a substantial distance, such ribs or flanges on the top wall extending outwardly beyond the top loading opening. The top doors closing the loading openings in this type of construction are customarily supported for longitudinal movement in outwardly spaced relation to the top wall of the body in order to clear the external ribs or flanges thereon, thus leaving a space between the inner face of the door and the top wall of the body outwardly of the loading opening when the door is closed into which refuse may move upon a compacting movement of the compaction blade, so that refuse often spills over the upper end of the blade and falls down in front of the blade during compaction. At times, refuse may be trapped in this space between the inner face of the door and the upper edge of the blade and become jammed between the blade and the top of the body, resulting in damage to the compaction mechanism.

Moreover, refuse is frequently heaped up into this excess space between the door and the top wall of the body where it remains when the door is closed, so that the refuse then falls in front of the compaction blade when the blade moves toward the rear of the body past the opening.

SUMMARY OF THE INVENTION

Briefly described, the invention comprises a top door and operating mechanism therefor for use with a vehicle or container of the top loading type having a door opening in its top wall. The door is shaped to fit the door opening with a slight marginal overlap when the door is closed, so that the inner face of the door provides a substantially continuous inner surface with the top wall of the body from end to end thereof. The invention is particularly useful in connection with refuse vehicles having an upright compaction plate therein movable longitudinally to move the refuse away from the door opening and compact the same against the rear door of the vehicle, the blade being closely fitted to such inner surface to prevent spilling of the refuse over the upper end of the blade.

The door is supported on the trackway by front and rear rollers, which roll along the trackway rails, and support means is provided positioned for engagement with the door to hold the door rollers against movement out of said main rail portions, to prevent the rollers from entering the turnouts during closing movement of the door, until the door is nearly in registration with the opening, the door being disengageable from such support means to allow the rollers to move downwardly along the turnouts to move the door to closed position.

The door is opened and closed by suitable mechanism such as a pressure fluid actuated cylinder.

The downward movement of the door during its closing movement may be used to press down refuse which has been heaped up in the vehicle to extend somewhat above the door opening during compaction of the refuse.

The door is movable along a trackway having spaced rails along each side of the door opening, each formed with a main rail portion extending throughout the length of the opening and beyond one end thereof and having longitudinally spaced turnout portions located within the front and rear edges of the opening beneath said main rail portion.

BRIEF DESCRIPTION OF THE VIEWS OF THE DRAWINGS

FIG. 1 is a side elevational view, partly broken away and partly in cross-section, illustrating a preferred embodiment of the invention and showing a top loading refuse vehicle with the top door thereof in its closed position;

FIG. 2 is a fragmentary longitudinal, central, cross-sectional view, on a somewhat enlarged scale of the top portion of the vehicle of FIG. 1, showing the top door and its operating mechanism, the door being shown in its closed position;

FIG. 3 is a fragmentary, longitudinal, central, cross-sectional view, on a somewhat enlarged scale, of the top portion of the vehicle of FIG. 1, showing the top door and its operating mechanism, the door being shown in its closed position;

FIG. 4 is a view similar to that of FIG. 3, showing the door in open position; and, FIG. 5 is a cross-sectional view, taken along the line 5—5 of FIG. 4, looking in the direction indicated by the arrows.

DETAILED DESCRIPTION OF A PARTICULAR EMBODIMENT OF THE INVENTION

The top door mechanism of the invention is illustrated herein in connection with application to a refuse vehicle of the trailer type, it being understood that the invention is applicable to other types of vehicles or containers in which a sliding door is to be provided which closes in substantially flush relation with the top of the vehicle. The vehicle, generally designated 10, is of a conventional trailer type, having a generally rectangular body mounted on rear wheels 12, and provided at its front end with a king pin 14 for engagement with suitable fifth-wheel mechanism of a towing vehicle, such as a tractor truck, in the usual manner. Suitable means is provided for supporting the trailer at its front end when the same is not attached to the towing vehicle, such as rollers mounted on adjustable legs, one of which is indicated at 16 in FIG. 1.

The body of the trailer, indicated by the numeral 18, is of conventional construction, formed with sheet metal sides and a top wall 20, which may be suitably reinforced, as by means of external reinforcing bars on flanges 22, the top wall being provided with a loading opening 24 located at the front end of the trailer, through which refuse may be dumped into the body from any suitable source, such as an elevated hopper 26, indicated in dash lines in FIG. 1.

A real end door of a usual type, not shown, is provided on the trailer, which may be opened to allow the refuse therein to be ejected.

The body is provided with a floor or bottom wall 28 which may be supported on a suitable underframe structure 30 in the usual manner, and within the body a compacting and ejector panel or blade 32 is supported on the floor for longitudinal reciprocation therein in an upright position with the upper end of the blade extending to a position barely out of contact with the inner surface of the top wall 20. The panel or blade 32 is moved by suitable mechanism, such as a pressure cylinder 33, by which the blade may be moved from a retracted position at the front end of the body, as seen in FIG. 1, toward the rear end thereof to move refuse deposited in the body through the opening 24 toward the rear of the vehicle and to compact the refuse against the rear door thereof. The cylinder 33 is of a usual type having pressure fluid connections at each end by which pressure fluid from any convenient source may be supplied to either end of the cylinder while allowing an outflow of fluid from the other end to move the compaction blade longitudinally in the body.

The body is provided with a trackway having spaced apart, parallel rails 34 along each side of and above the door opening 24, which trackways preferably extend from the forward edge of the door opening rearwardly past the rear edge thereof to a distance beyond the rear edge of the door opening at least equal to the length of the same. The rails 34 may be of channel shape in cross-section, located along each side of the door opening, as seen in FIG. 5, and are each formed with an upper, main rail portion 36, spaced above the top wall 20 on the reinforcing members 22, and longitudinally spaced switch or turnout portions 38 and 40, extending below the main rail portion. The turnouts or switches 38 and 40 are, in the present illustration, located longitudinally within the front and rear edges of the door opening.

A door 42, of rectangular shape, is mounted on the trackway for rolling movement therealong between the rails 34, as by means of rollers 44, which door is preferably of a size slightly larger than the door opening 24, so that the margins of the inner face of the door will overlap the margins of the top wall 20 about the door opening when the door is closed, as seen in FIG. 3. The door may be of relatively heavy structure, strongly braced and having a planar inner face which completely closes the door opening when the door is closed.

The door is operated by suitable mechanism, such as an elongated pressure cylinder 46, whose piston rod 48 is pivotally connected to the rear end of the door, as by means of a perforated lug 50 extending upwardly from the door. The rear end of the cylinder 46 may also be suitably pivotally connected to the vehicle, as by means of a perforated lug 52, atatched thereto, so that the entire door actuating mechanism may swing vertically to compensate for the vertical movement of the door when the door is moved to open or closed position.

The pressure cylinder may be of a usual type, having pressure fluid connections at both ends, through which pressure fluid from any suitable source may be admitted to either end of the cylinder while allowing an outflow of fluid from the other end thereof to actuate the cylinder in a well known manner.

Door supporting rollers 54 are mounted on the top wall of the body in laterally spaced apart relation at the same longitudinal location thereon and extending upwardly above the top wall in position for engagement with the door to hold the door in a horizontal position during closing movement of the door until the front most of the door rollers 44 reach positions to enter the front most turnouts 40 of the trackway. The rollers 54 are positioned to prevent downward movement of the door during its closing movement until the front most ones of the rollers 44 pass the turnouts 38, and the front and rear rollers of the door reach positions to enter the front and rear turnouts, respectively, of the trackway.

In the operation of the equipment, the packer blade 32 is moved to its frontmost position in the body, as seen in FIG. 1, and with the top door opened, refuse may then be dumped into the body through the opening 24 in front of the blade. When a sufficient amount of refuse has been thus deposited in the vehicle, the door may then be closed by actuation of the cylinder 46, and the jack blade then operated by actuation of the cylinder 34 to move the refuse rearwardly to clear the door opening and compact the refuse against the rear door of the body.

As the door 42 is moved toward closed position, the door rollers 44 will roll along the main rail portions 36, the door being held by the rollers 54 against the accidental movement of the frontmost of the rollers into the rearmost turnouts 38. When the door reaches a position of forward movement in which the door rollers are positioned to enter the turnouts 38 and 40 of the trackway, the door will have passed beyond the rollers 54, so that the door rollers may enter the turnouts to allow the door to descend along the turnouts to its fully closed position.

To move the door to open position, the pressure cylinder 46 is actuated to pull the door rearwardly, whereupon the rollers 44 move out of the turnouts to lift the door away from the top wall 20 as the door moves rearwardly along the trackway.

It will be apparent that when the door is in closed position, the inner face of the door will be substantially in the plane of the top wall of the body, so that refuse cannot pass over the upper end of the packer blade 32 as the refuse is compacted in the body. Moreover, in the event that refuse should be piled up somewhat so that it extends upwardly above the door opening, the refuse will be pressed downwardly into the vehicle as the door is closed by the downward movement of the door as the rollers 44 move down in the turnouts of the trackway.

It will thus be seen that the invention, constructed and operated as described above, provides top door mechanism for vehicles of the kind mentioned, which is easily controlled and operated, which is effectively prevented from jamming or sticking during opening and closing, whose inner face, when closed, is positioned to prevent the spilling over of refuse past the upper end of the compaction blade, and which is effective to press down and hold refuse against upward movement in the body during the loading of same.

The invention is disclosed herein in connection with a particular embodiment of the same, which is intended by way of illustration only, it being evident that various changes can be made in the construction and arrangement of the parts within the scope of the appended claim.

Having thus clearly shown and described the invention, what is claimed as new and desired to secure by Letters Patent is:

1. Door mechanism for a receptacle having a top wall provided with an opening through which material may be inserted downwardly into the receptacle, comprising:

a door for opening and closing the opening;

means movably supporting the door on the receptacle for movement into and out of closing relation to the opening and including;

trackway means extending along opposite sides of the opening and having upper portions spaced above and parallel to said wall between the ends of and beyond one end of the opening, and lower turnout portions below said upper portions between the ends of the opening;

means positioned for coaction with the door and trackway means to movably support the door on the trackway means for movement therealong to an open position on said upper portions beyond said one end of the opening and to a position on said turnout portions in closing relation to said opening and including, rollers rotatably mounted on the door in position for rolling engagement with the trackway, said turnout portions having downwardly sloping portions positioned for engagement with said rollers to allow the door to move toward said opening in parallel relation to the plane of the opening when the door reaches a predetermined position during its closing movement and portions located beyond said sloping portions in the direction of closing movement of the door disposed parallel to the plane of the opening for engagement with the rollers to hold the door against movement away from said plane when the door is closed.

References Cited

UNITED STATES PATENTS 2,269,630   1/1942   Marmello _____ 49—221 XR
2,722,413   11/1955   Coors _____ 49—221

FOREIGN PATENTS 539,046   8/1941   Great Britain.

KENNETH DOWNEY, Primary Examiner

U.S. Cl. X.R.

220—41